July 15, 1969     F. E. RYDER     3,455,201

TUBULAR FASTENER

Filed Aug. 24, 1967

INVENTOR.
Francis E. Ryder
BY
His Att'ys

United States Patent Office 3,455,201
Patented July 15, 1969

3,455,201
TUBULAR FASTENER
Francis Eugene Ryder, Des Plaines, Ill., assignor to Illinois Tool Works Inc., Chicago, Ill., a corporation of Delaware
Filed Aug. 24, 1967, Ser. No. 663,102
Int. Cl. F16b 13/04, 19/00
U.S. Cl. 85—81                                    4 Claims

ABSTRACT OF THE DISCLOSURE

A tubular fastener element of inherent resiliency to be inserted for mounting in an apertured support panel and including collapsible body sections with edge shoulder portions and axially projecting hook shoulder portions substantially opposing one another to engage corresponding inner and outer surfaces of the support panel around the aperture therethrough; and adapted to receive and mount a radially outwardly shouldered anchor member insertable through the fastener with the shoulder of the anchor member trapped by the inner end of the fastener when fully inserted; and wherein the anchor members have attachment such as a cable or the like for various uses including, as an example, webbing for seat cushions and the like.

---

This invention relates to new and useful improvements in a resilient fastener having opposed shoulder means collapsible by insertion through an aperture in a support panel and expansible to a position with the shoulder means engaging opposite sides of the panel around the aperture therethrough and adapted to receive and support an anchor member having attachments, such as cables, secured thereto.

Another object of this invention is to provide a fastener substantially of the above type and in split frusto-conical form to receive by insertion therethrough an anchor member having a shoulder engageable with and trapped by the smaller end of the fastener upon insertion to prevent removal.

A further object of the invention is to provide an assembly of fastener element and anchor member which latter includes an additional shoulder portion positioned for maintaining the shoulder means of the fastener in panel engaging position.

The invention still further aims to provide a fastener of the above type formed from a resilient sheet material blank permitting economical manufacture and formation to its frusto-conical shape.

The above and other objects of the invention will in part be obvious and will be hereinafter more fully pointed out.

Figure 9:
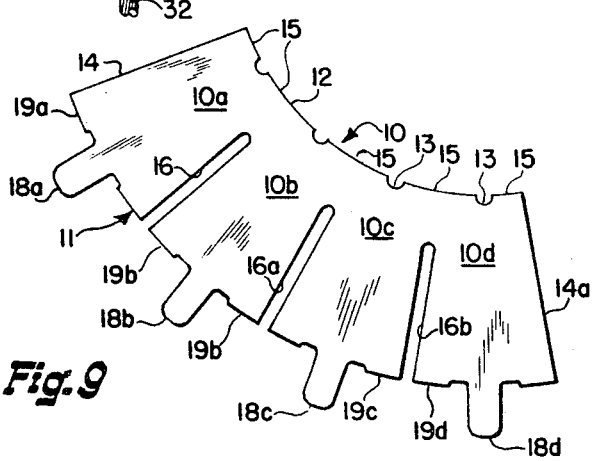
FIG. 9 is a plane view of a blank from which the fastener of FIG. 1 is formed.

The insertable sheet material fastener is of frusto-conical shape and is formed from the blank 10 shown in FIG. 9. This blank 10 is arcuate with a curved outer edge 11, a curved inner edge 12 and radial end edges 14, 14a. The curved inner edge has a plurality of spaced notches 13 forming a plurality of spaced teeth 15, for purposes set forth hereinafter. The blank is also provided with slits 16, 16a, 16b extending from the outer edge 11 inwardly but terminating short of the inner edge 12. These slits divide the blank 10 into four body sections 10a, 10b, 10c, 10d. A finger or tongue extends outwardly from substantially the center of the outer edge of each body section, as indicated at 18a, 18b, 18c, 18d corresponding respectively to the associated body section. On each side of these tongues and at the edge of each body section, there are identical edge portions 19a, 19b, 19c, 19d providing shoulder portions to function in the manner described hereinafter.

Figure 1:
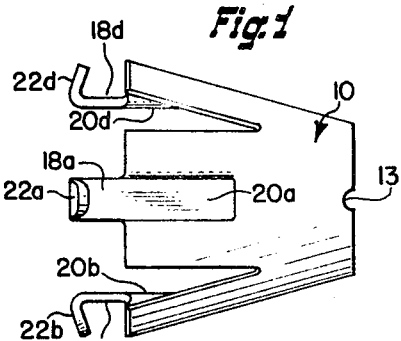
FIG. 1 is a side elevation of the fastener.
Figure 2:
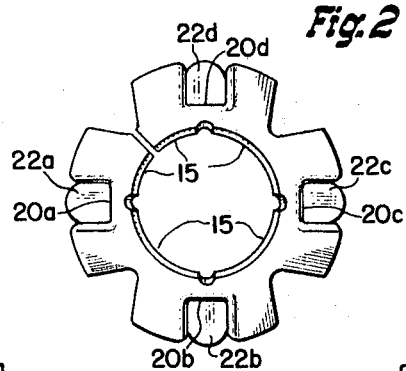
FIG. 2 is an end view of the fastener of FIG. 1.

Each of the body sections 10a, 10b, 10c, 10d is longitudinally depressed along a radial portion thereof as indicated at 20a, 20b, 20c, 20d with particular reference to FIGS. 1 and 2. These depressed portions are aligned with the corresponding fingers or tongues so that these are likewise depressed inwardly of their respective body sections, with the longitudinally depressed body portions 20a, 20b, 20c and 20d forming a rigid channel shaped section which axially and radially reinforces the shoulder portions 19a, 19b, 19c and 19d. The ends of the fingers or tongues are bent outwardly and slightly toward the respective body sections as indicated at 22a, 22b, 22c, 22d. While these outwardly bent end portions are flanked on each side by corresponding shoulder portions 19a, 19b, 19c, 19d of the body sections, they will provide shoulders in opposition to those shoulder portions in the manner to be hereinafter pointed out. The fastener may be of metal or other suitable material to have inherent resiliency when shaped to its frusto-conical form with the edges of the slits 16, 16a and 16b spaced or lapped to permit sufficient collapsing for insertion in the aperture of a support panel as will be described.

Figure 3:
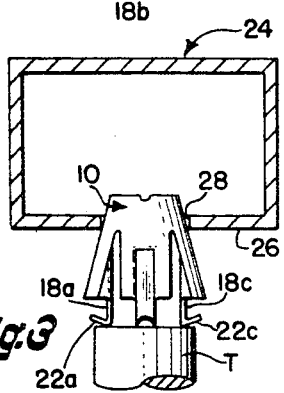
FIGS. 3, 4 and 5 are views showing a support structure in section with an apertured support panel and showing successive steps in the insertion of the fastener through the panel aperture for mounting thereon.
Figure 4:
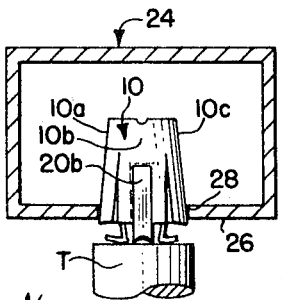
Figure 5:
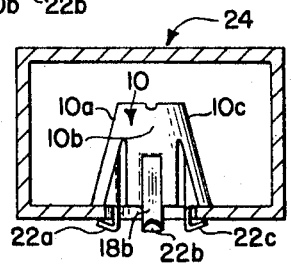

With reference to FIGS. 3, 4 and 5, there is shown a channel member 24 having one wall 26 thereof apertured, as at 28. This channel member may contribute part of a frame to anchor webbing for seat cushions or the like. The fastener element is initially positioned as shown in FIG. 3, and a suitable tool T is employed to force the fastener inwardly of the aperture 28. The progression of this forceful insertion is next shown in FIG. 4 where the body sections of the fastener and their respective hooked end portions are collapsed by engagement with the bounding wall of the aperture 28. In the final assembled position of FIG. 5, the tool T is removed and the inherent resiliency of the split fastener element causes the same to expand to the position shown. Thus, the shoulder or abutment edges 19a, 19b, 19c, 19d engage the rear or inner face of the wall portion 26 around the aperture therethrough and the hooked shoulder ends 22a, 22b, 22c, 22d engage the outer surface of the wall portion 26 around the aperture therethrough. The inherent resiliency of the split ring fastener element causes the body sections to expand to the position of FIG. 5 and carrying with each body section the associated finger and hook portion. The finger portions 18a, 18b, 18c, 18d can be arranged to abut the inner surface of the aperture 28 and movement to that position tends to cause the slightly rebent end portions 22a, 22b, 22c, 22d to more firmly engage the outer surface of the wall 26. Thus a very firm mounting for the fastener element is provided.

Figure 6:
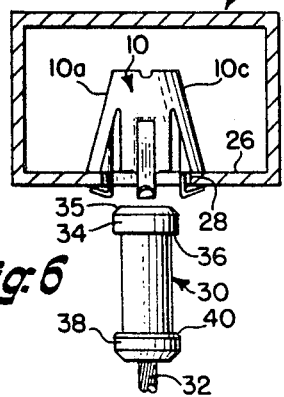
FIGS. 6, 7 and 8 are views similar to FIGS. 3, 4 and 5 and showing the successive steps of mounting an anchor member in the previously mounted fastener.
Figure 7:
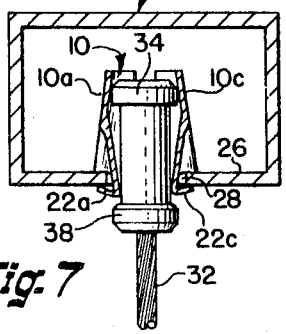
Figure 8:
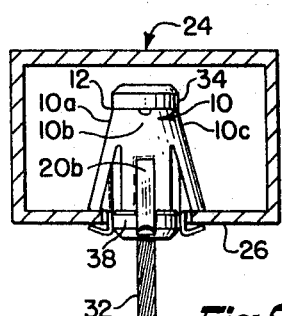

After such installation of the fastener element, it is possible to securely mount the terminal anchor member 30 of a cable 32 and such terminal and cable assembly may take the form of an anchored webbing arrangement for seat cushions and the like. The fastener element is adapted for mounting in the aperture of variously shaped frames as will be apparent for this and other purposes. The anchor member 30 includes a radial end enlargement 34 with a tapered free end 35 and a rearwardly or downwardly facing shoulder 36. The opposite end of the member 30 includes a radial enlargement 38 having a shoulder 40 facing the shoulder 36. In the showing of FIG. 6, the anchor member is positioned for insertion into the fastener element by positioning the tapered free end 35 of the enlargement 34 adjacent thereto. Inward movement of the anchor member may be guided by the inclined edge 35 or the enlargement 34 may be adapted to pass freely between the inner surfaces of the depressed portions 20a, 20b, 20c, 20d. As the enlargement 34 on the anchor member 30 makes contact with the inner surface of the reduced end of the frusto-conical fastener element, the body thereof is expanded and the reduced portion of the anchor member between the shoulders 36, 40 will permit any inward movement of the projecting arms or fingers 18a, 18b, 18c, 18d, is such does occur. Continued inward movement of the anchor member permits the enlargement 34 to extend entirely through the smaller end of the fastener element expanding the same during this movement. The body wall of the fastener element then snaps back to a position around the reduced end portion and with the inner edge of the fastener element and its spaced teeth 15 engaged behind the shoulder 36 to prevent removal of the anchor member. The inner edge of the enlargement 38 may be slightly tapered in merging with the shoulder 40 to facilitate passage of this enlargement between the finger portions 18a, 18b, 18c, 18d, if necessary. The dimensioning between the enlargements 34 and 38 is such that in the installed position of FIG. 8, the outer surface of the enlargement 38 will be immediately adjacent the fingers and prevent their inward movement, thus maintaining the tight fit between the fastener element and the wall portion 26 and preventing any inadvertent withdrawal even with excessive force applied to the cables or strands 32 and transmitted to the fastener element through the enlargement 34.

While one form of the invention has been shown for purposes of illustration, it is to be clearly understood that various changes in the details of construction and arrangement of parts may be made without departing from the spirit and scope of the invention.

I claim:

1. A fastener element for mounting in an apertured supporting wall, comprising a longitudinally split resilient ring capable of partial collapse and expansion to normal position, said ring being frusto-conical in shape having circumferentially spaced finger portions projecting axially beyond the larger end thereof and with the ends of the finger portions bent outwardly to provide shoulders spaced axially beyond the edge of the ring, the portions of the edge of the ring to each side of a finger portion providing abutment edges relatively positioned in lateral opposition with respect to the outwardly bent ends of the finger portions for trapping therebetween the supporting wall when the fastener element is mounted in the supporting wall aperture, said ring being provided with longitudinal slots dividing said ring into circumferentially spaced body sections with one of said finger portions projecting centrally from each body section, each of said body sections being centrally depressed in line with a corresponding finger portion to depress the finger portion to an inwardly offset position with respect to its corresponding body section and forming a channel shaped section for axially and radially reinforcing said abutment edges, said fastener element adapted for forceable insertion within the aperture in the supporting wall by collapsing the ring with subsequent expansion thereof when installed to position the abutment edges in engagement with the inner surface of the supporting wall around the aperture therethrough and with the shoulders formed by the outwardly directed ends of the finger portions engaging the outer surface of the supporting wall around the aperture therethrough.

2. A fastener element as claimed in claim 1, wherein each finger portion is offset inwardly from its corresponding body section positioning the outwardly bent ends thereof in lateral offset position with respect to the adjacent abutment edges for engaging the supporting wall therebetween.

3. A fastener element as claimed in claim 2 mounted in an apertured supporting wall and in combination with a cable terminal including an inner enlargement with a rearwardly facing shoulder free to pass within the inwardly offset finger portions to a position engaging the inner periphery of the reduced end of the frusto-conical ring to spread the ring outwardly and enable the free edge thereof to trap the terminal in rear of said shoulder, and a secondary enlargement on said terminal positioned immediately adjacent the inner surfaces of the inwardly offset finger portions to maintain the same in engagement with the supporting wall around the aperture when the reduced end of the frusto-conical ring traps the said shoulder.

4. A fastener element as claimed in claim 1, wherein the outwardly bent ends of the finger portions are further bent toward the edge of the ring for increased gripping action against the adjacent surface of the supporting wall.

References Cited

UNITED STATES PATENTS

| 2,194,855 | 3/1940 | Jones | 85—5 |
| 2,667,200 | 1/1954 | Bedford | 85—80 |
| 2,936,668 | 5/1960 | Meyer | 85—5 |
| 2,954,248 | 9/1960 | Brickman | 287—20 |

FOREIGN PATENTS 677,089    8/1952    Great Britain.

EDWARD C. ALLEN, Primary Examiner

U.S. Cl. X.R.

85—5, 85